United States Patent
Stephenson et al.

(10) Patent No.: US 10,560,348 B2
(45) Date of Patent: Feb. 11, 2020

(54) NETWORK ACCESS DEVICE FOR FACILITATING THE TROUBLESHOOTING OF NETWORK CONNECTIVITY PROBLEMS

(71) Applicant: ARRIS Enterprises LLC, Suwanee, GA (US)

(72) Inventors: David Stephenson, San Jose, CA (US); Doron Givoni, San Jose, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 246 days.

(21) Appl. No.: 15/621,685

(22) Filed: Jun. 13, 2017

(65) Prior Publication Data
US 2018/0176101 A1 Jun. 21, 2018

Related U.S. Application Data
(60) Provisional application No. 62/436,997, filed on Dec. 20, 2016.

(51) Int. Cl.
| H04L 12/24 | (2006.01) |
| H04L 29/08 | (2006.01) |
| H04L 12/26 | (2006.01) |

(52) U.S. Cl.
CPC ...... *H04L 41/5074* (2013.01); *H04L 41/0668* (2013.01); *H04L 43/0811* (2013.01); *H04L 67/02* (2013.01)

(58) Field of Classification Search
CPC ............. H04L 41/0668; H04L 41/5074; H04L 43/0811; H04L 67/02
See application file for complete search history.

(56) References Cited

U.S. PATENT DOCUMENTS

| 6,925,300 | B2 * | 8/2005 | Horne | H04W 24/00 |
| | | | | 379/1.01 |
| 7,024,187 | B2 * | 4/2006 | Moles | H04W 24/00 |
| | | | | 455/418 |
| 9,226,167 | B2 * | 12/2015 | Olson | H04L 41/06 |
| 2002/0072359 | A1 * | 6/2002 | Moles | H04W 24/00 |
| | | | | 455/425 |
| 2003/0064719 | A1 * | 4/2003 | Horne | H04W 24/00 |
| | | | | 455/423 |

(Continued)

*Primary Examiner* — Michael C Lai
(74) *Attorney, Agent, or Firm* — Stewart M. Wiener

(57) ABSTRACT

A network access device for facilitating the troubleshooting of network connectivity problems on a directly connected client device is provided. In one embodiment, the network access device can receive, from the client device, a request directed to a preconfigured web address associated with the network access device. In response to the request, the network access device can generate a web page comprising a ticket number for the client device and a link or form element for submitting a support request and can transmit the web page to the client device. The network access device can subsequently receive a submission of the support request from the client device. In response to the submission, the network access device can automatically collect diagnostic information pertaining to the client device. The network access device can then transmit the diagnostic information and the ticket number to one or more remote servers.

22 Claims, 4 Drawing Sheets

(56) References Cited

U.S. PATENT DOCUMENTS

| | | | |
|---|---|---|---|
| 2007/0197206 A1* | 8/2007 | Olson | H04L 41/06 455/423 |
| 2011/0149720 A1* | 6/2011 | Phuah | H04L 41/0681 370/216 |
| 2013/0103749 A1* | 4/2013 | Werth | G06F 9/5072 709/203 |
| 2014/0052645 A1* | 2/2014 | Hawes | G06Q 10/20 705/304 |
| 2014/0123180 A1* | 5/2014 | Xiao | H04N 21/64723 725/37 |
| 2016/0350173 A1* | 12/2016 | Ahad | G06F 11/3495 |

* cited by examiner

NETWORK ACCESS DEVICE FOR FACILITATING THE TROUBLESHOOTING OF NETWORK CONNECTIVITY PROBLEMS

CROSS-REFERENCES TO RELATED APPLICATIONS

The present application claims the benefit and priority of U.S. Provisional Patent Application No. 62/436,997, filed Dec. 20, 2016, entitled "GATHERING DIAGNOSTIC INFORMATION FOR END-USER DEVICES HAVING NETWORK CONNECTIVITY PROBLEMS." The entire contents of this provisional application are incorporated herein by reference for all purposes.

BACKGROUND

In a typical enterprise or organization, end-users connect to the Internet with their client devices (e.g., desktops, laptops, mobile phones, etc.) through Layer 2 edge networks that are provided and maintained by an information technology (IT) department of the enterprise/organization. If an end-user at a particular office location experiences a network connectivity problem, the end-user is often advised to contact an IT support representative that is situated at a remote location (e.g., a call center or central office) via phone or email to help troubleshoot the problem. The IT support representative generally needs certain pieces of diagnostic information regarding the end-user's client device and how that device is connected to the edge network (e.g., client MAC address, client IP address, configured DNS server(s), etc.) in order to begin the troubleshooting process. However, since this diagnostic information typically resides on the client device itself (and/or the network access device of the edge network), the remotely-located IT support representative cannot directly retrieve it.

It is possible for the end-user to independently find some or all of the required diagnostic information by looking through the network settings of his/her client device; but, in some cases, the end-user may not have the technical knowledge to perform this task. In these cases, the support representative must walk the end-user through a series of steps to find each piece of diagnostic information (e.g., open command prompt on client device, enter command ABC, provide the value shown in field XYZ, etc.), which can be a tedious, time consuming, and potentially error-prone process.

SUMMARY

A network access device for facilitating the troubleshooting of network connectivity problems on a directly connected client device is provided. In one embodiment, the network access device can receive, from the client device, a request directed to a preconfigured web address associated with the network access device. In response to the request, the network access device can generate a web page comprising a ticket number for the client device and a link or form element for submitting a support request and can transmit the web page to the client device. The network access device can subsequently receive a submission of the support request from the client device. In response to the submission, the network access device can automatically collect diagnostic information pertaining to the client device. The network access device can then transmit the diagnostic information and the ticket number to one or more remote servers.

A further understanding of the nature and advantages of the embodiments disclosed herein can be realized by reference to the remaining portions of the specification and the attached drawings.

DETAILED DESCRIPTION

In the following description, for purposes of explanation, numerous examples and details are set forth in order to provide an understanding of specific embodiments. It will be evident, however, to one skilled in the art that certain embodiments can be practiced without some of these details, or can be practiced with modifications or equivalents thereof.

1. Overview

Embodiments of the present disclosure provide techniques that can be implemented by a network access device (e.g., a network switch, a wireless access point (WAP), etc.) for facilitating the troubleshooting of a network connectivity problem that is experienced by a client device directly connected to the network access device. At a high level, these techniques can enable the network access device to automatically collect diagnostic information pertaining to the client device and communicate this diagnostic information to one or more remote servers (e.g., a cloud-based management platform). Once stored at the remote server(s), the collected diagnostic information can be accessed by an IT support representative or some other entity (e.g., an automated agent) in order to troubleshoot and potentially resolve the network connectivity problem.

These and other aspects of the present disclosure are described in further detail below.

2. System Environment

Figure 1:
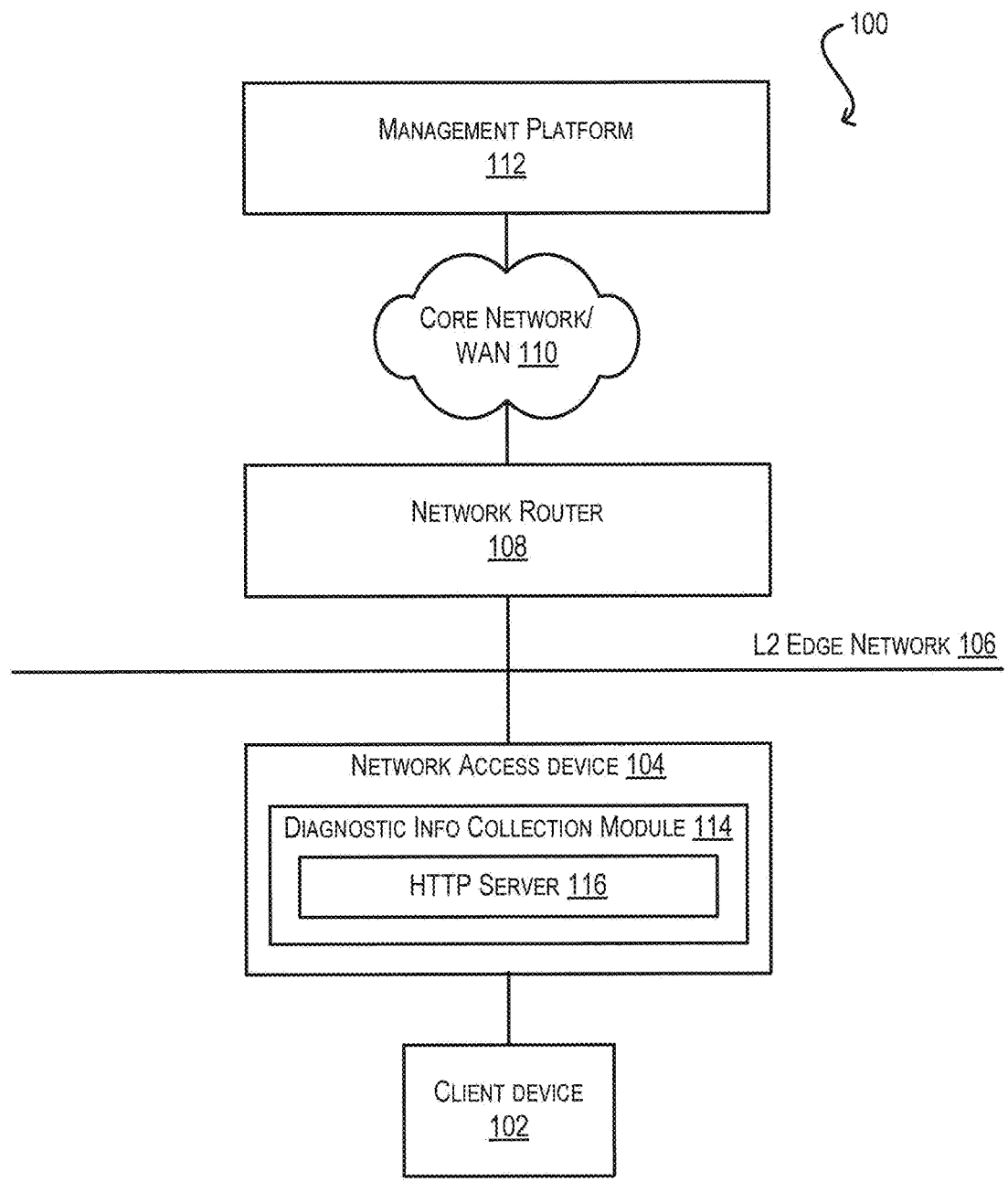
FIG. 1 depicts a system environment according to an embodiment.

FIG. 1 depicts a system environment 100 in which embodiments of the present disclosure may be implemented. As shown, system environment 100 includes a client device 102 that is directly connected to a network access device 104. Network access device 104 is part of a Layer 2 edge network (i.e., LAN segment) 106, which is in turn connected to a network router 108. Network router 108 provides Layer 3 routing between edge network 106 and a core or wide-area network (WAN) 110, such as the Internet.

In one embodiment, network access device 104 may be a Layer 2 switch or bridge. In this case, client device 102 may be directly connected via a physical cable to a port of the switch/bridge. In another embodiment, network access device 104 may be a wireless access point (WAP). In this case, client device 102 may be directly connected via a WiFi link to the WAP. In yet other embodiments, network access device 104 may be any other type of edge device that can serve as a network entry point into edge network 106 and core/wide-area network 110.

As mentioned previously, in scenarios where a client device such as device 102 of FIG. 1 experiences a network connectivity problem, the end-user of the client device is often advised to contact (via, e.g., phone or email) a remotely-located IT support representative in order to receive help in troubleshooting and resolving the problem. However, to begin the troubleshooting process, the IT support representative typically needs access to diagnostic information that is only available on client device 102 (and/or network access device 104). If the end-user is not technically savvy enough to find this information on his/her own, the IT support representative must walk the end-user through a series of steps for finding and relaying the diagnostic information to the representative, which can be burdensome and time-consuming for both parties. Further, since the end-user may not be able to follow all of the instructions provided by the IT support representative correctly, errors/misunderstandings may occur that can further delay and complicate the process.

To address these shortcomings, network access device 104 of FIG. 1 is enhanced to include a novel diagnostic info collection module 114 comprising an HTTP server 116. In one embodiment, diagnostic info collection module 114 can be implemented in software that is executed by, e.g., a management processor of network access device 104 (not shown). In other embodiments, diagnostic info collection module 114 can be implemented in hardware or a combination of software and hardware.

Generally speaking, diagnostic info collection module 114 can automatically collect diagnostic information pertaining to client device 102 at a time client device 102 experiences a network connectivity problem. Diagnostic info collection module 114 can also automatically communicate this collected information to one or more remote servers, such as a cloud-based management platform 112, for storage thereon. Then, when the end-user of client device 102 contacts the IT support representative to receive help in resolving the network connectivity problem, the IT support representative can retrieve the device's diagnostic information directly from management platform 112, rather than asking the end-user to manually search for and provide it. In this way, diagnostic info collection module 114 can significantly simplify and streamline the overall troubleshooting process, resulting in a better experience for both end-user and the support representative. Additional details regarding the implementation of diagnostic info collection module 114 are provided in the sections that follow.

It should be appreciated that system environment 100 of FIG. 1 is illustrative and not intended to limit embodiments of the present disclosure. For instance, although network access device 104 is shown as a single physical device, in certain embodiments network access device 104 may correspond to system of physical devices operating in concert as a logical network access device. By way of example, network access device 104 may be a stacking system or an extended bridge as defined under the IEEE 802.1BR standard. In these embodiments, diagnostic info collection module 114 may be configured to run on a particular member device in the system of devices, such as the master or active device.

Further, the various entities shown in system environment 100 may be arranged according to different topologies/configurations, and/or may include functions or subcomponents not specifically described. One of ordinary skill in the art will recognize other variations, modifications, and alternatives.

3. Troubleshooting Workflow

Figure 2:
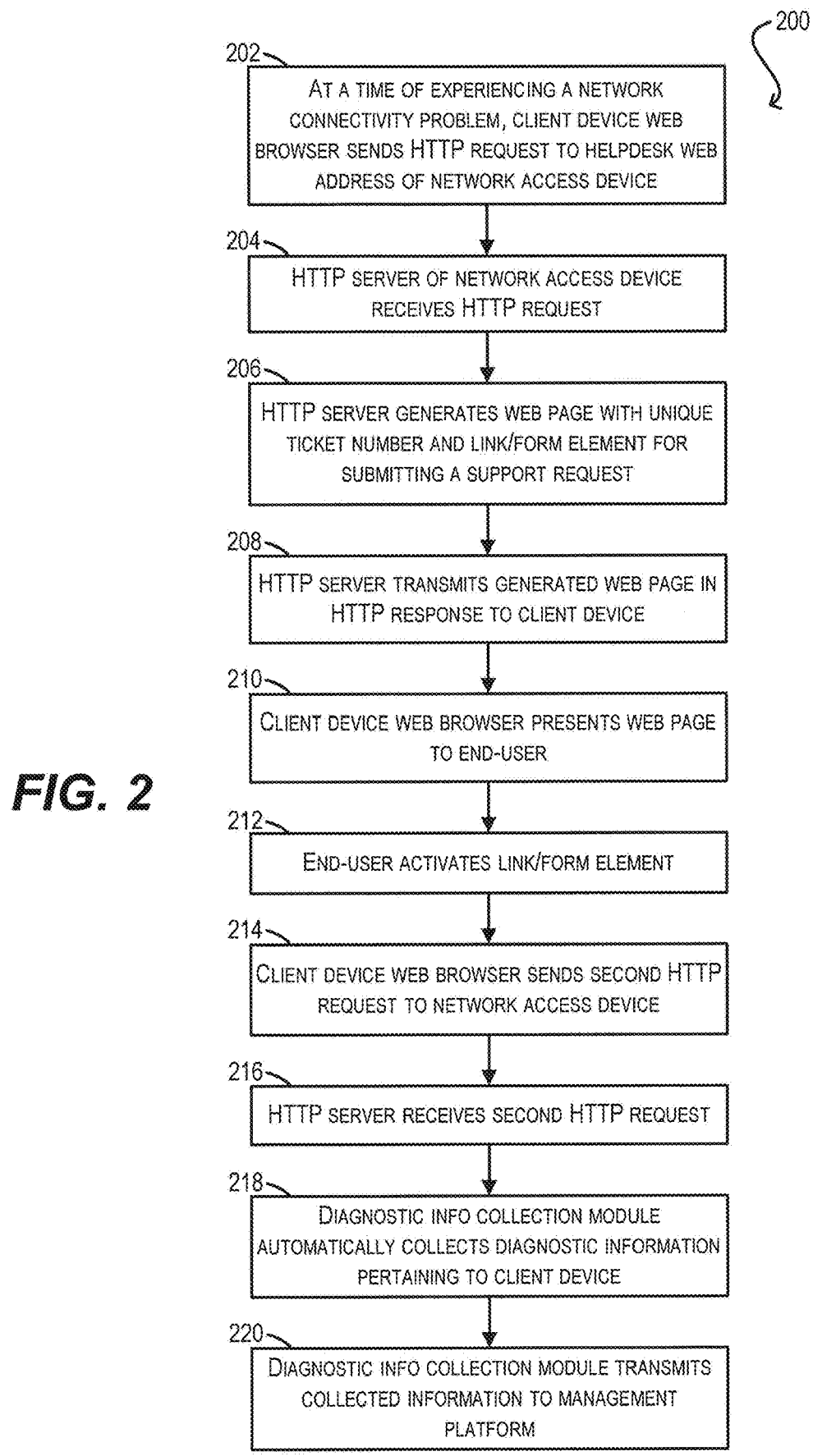
FIG. 2 depicts a troubleshooting workflow according to one embodiment.

To clarify the operation of diagnostic info collection module 114, FIG. 2 depicts a high-level workflow 200 can that can be executed by module 114 in order to facilitate the troubleshooting of a network connectivity problem on client device 102 according to an embodiment. Workflow 200 assumes that HTTP server 116 of module 114 is associated with a "helpdesk" web address that is known to client device 102 (and/or to the end-user of client device 102) as being a webpage/portal for reporting network connectivity issues. In a particular embodiment, this helpdesk web address can be a link-local URL (e.g., "http://help.local") whose corresponding IP address is advertised to client device 102 and to other client devices on the same VLAN via multicast DNS (mDNS).

Starting with block 202, at a time client device 102 experiences a network connectivity problem, the client device's web browser can, either automatically or in response to input from the end-user, send an HTTP request to HTTP server 116 via the helpdesk web address. As used herein, the phrase "network connectivity problem" is generally limited to problems that prevent client device 102 from communicating with core/wide-area network 110. An example of such a problem is a scenario in which client device 102 is unable to receive an IP address from a Dynamic Host Configuration Protocol (DHCP) server. Thus, the network connectivity problem described at block 202 does not preclude client device 102 from communicating with network access device 104 via the direct link connecting these two entities. Note that when a client device cannot obtain an IP address from a DHCP server, it self-assigns a link-local IP address. This link-local IP address is not a routable IP address, but is nevertheless useful for communicating with any host on the local subnet (including HTTP server 116).

At blocks 204 and 206, HTTP server 116 can receive the HTTP request and, in response, can generate a web page that includes (1) a unique ticket number for client device 102, (2) one or more contact options for contacting an IT support representative (e.g., email address, phone number, etc.), and (3) a link or form input element (e.g., button) for submitting a support request to that IT support representative in order to obtain help in resolving the network connectivity problem. Upon generating this web page, HTTP server 116 can transmit the web page in an HTTP response back to client device 102 (block 208). Client device 102 can subsequently present the web page to the end-user via the device's web browser (block 210).

Figure 3:
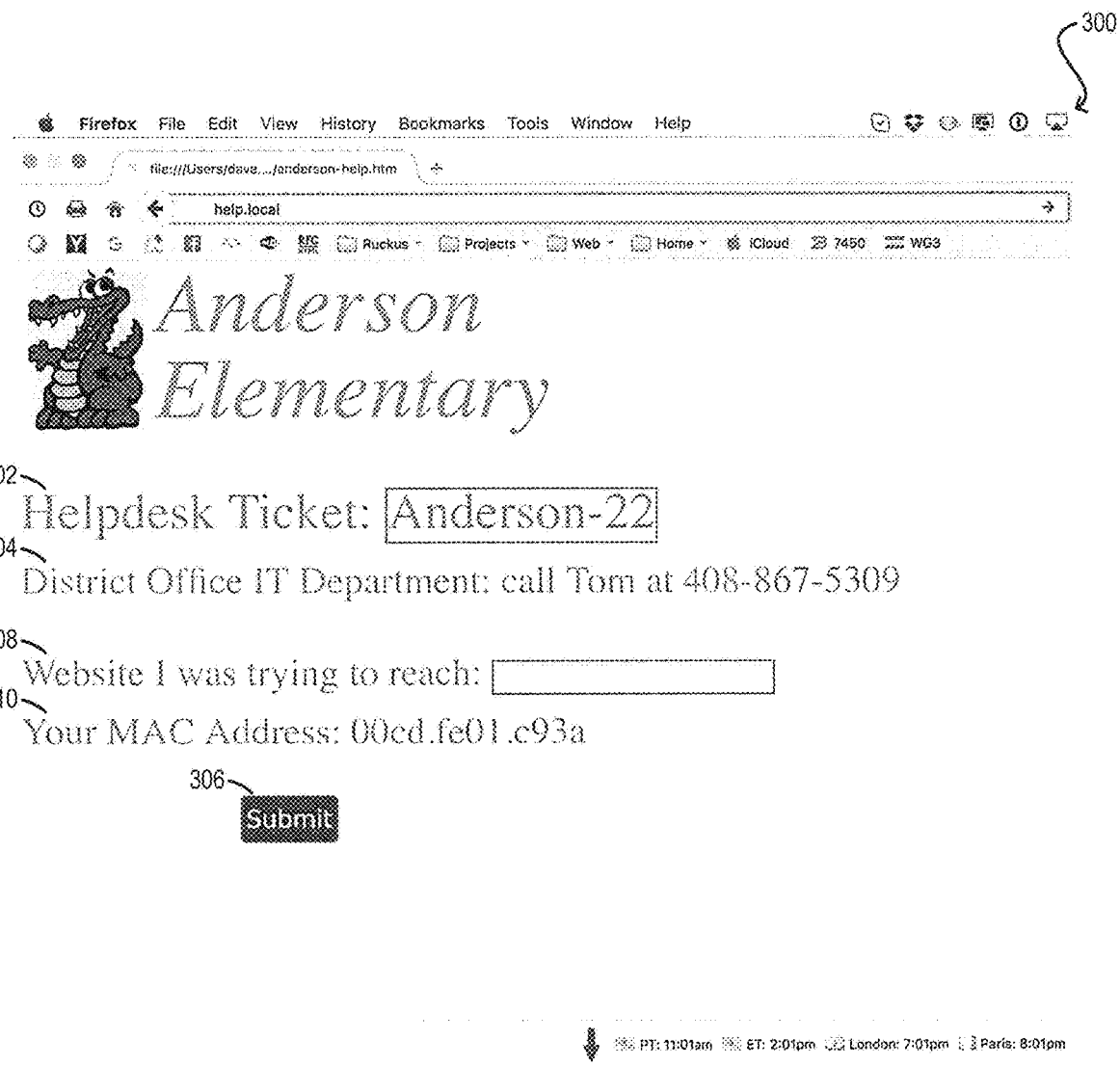
FIG. 3 depicts an example helpdesk webpage according to one embodiment.

FIG. 3 depicts one possible example of the web page generated at block 206 of FIG. 2 (web page 300) according to an embodiment. In this example, the ticket number, support representative contact information, and form input element are shown at reference numerals 302, 304, and 306 respectively. In addition, web page 300 includes an indication of the web page the end-user was trying to reach at the time of the network connectivity problem (308) and the MAC address of the client device (310).

Returning to FIG. 2, at block 212 the end-user can view the web page and activate the included link/form input element to submit a support request to the IT support representative. This can cause a second HTTP request to be transmitted to, and received by, HTTP server 116 of network access device 104 (blocks 214 and 216).

In response to receiving the second HTTP request, diagnostic info collection module 114 can automatically collect various types of diagnostic information pertaining to client device 102 that may be relevant to the IT support representative in troubleshooting the network connectivity problem (block 218). Examples of diagnostic information that may be automatically collected at this step can include the following:

Client MAC address
Client IP address
DNS server addresses
HTTP proxy configuration
Venue ID
Network access device ID (i.e., switch or WAP ID)
ID of network access device port to which the client device is connected
Status of network access device port
VLAN ID
Wireless authentication/authorization status (if applicable)
Results of DCHP exchange (if applicable)
URL the client device was trying to reach at the time of the problem (if applicable)

In some embodiments, diagnostic info collection module 114 can collect one or more portions of the diagnostic information above from the packet header fields included in the HTTP requests received at blocks 204 and 216. Alternatively or in addition, module 114 can collect one or more portions of the diagnostic information above from port/connection settings maintained on network access device 104.

Once diagnostic info collection module 114 has collected the diagnostic information pertaining to client device 102 at block 218, module 114 can transmit the collected diagnostic information, along with the unique ticket number generated previously, to management platform 112 (block 220). In a particular embodiment, this information can be transmitted in the form of one or more Syslog events, although any other message format can be used.

Finally, although not shown in FIG. 2, the end-user can get in touch with the IT support representative via one of the contact options listed on the web page and can relay the unique ticket number to the IT support representative. Using the ticket number, the IT support representative can retrieve the collected diagnostic information for client device 102 from management platform 112 and thereafter proceed with troubleshooting the network connectivity problem based on the retrieved information.

4. Enhancements and Alternatives

The remaining sections of this disclosure describe various enhancements and alternatives that may be implemented with respect to the high-level troubleshooting workflow of FIG. 2.

4.1 Loading the Helpdesk Web Address

In various embodiments, the manner in which the web browser of client device 102 is directed to the helpdesk web address in order to send the initial HTTP request to HTTP server 116 at block 202 of FIG. 2 can differ. For example, in one embodiment, the end-user of client device 106 may recognize that the device is experiencing a network connectivity problem and, as a result, may manually launch the web browser and enter the helpdesk web address in order to navigate to the helpdesk webpage and to report the problem.

In another embodiment, network access device 104 may be configured to automatically detect the network connectivity problem. In this case, upon detecting the problem, network access device 104 can issue a command to client device 102 instructing the device to launch the web browser and to load the helpdesk web address on behalf of the end-user. In these embodiments, an agent may be installed on client device 102 by, e.g., the enterprise's IT department or the end-user that is capable of accepting and processing this command.

In yet another embodiment, client device 102 itself (or a network troubleshooting application that has been loaded onto client device 102) may be configured to automatically detect the network connectivity problem. By way of example, client device 102 may automatically detect that it is unable to obtain a routable IP address via the DCHP discover process. In this case, upon detecting the problem, client device 102 can launch the web browser and load the helpdesk web address on behalf of the end-user. Alternatively, network access device 104 may automatically enable an HTTP captivation mode that causes all web browser communication to be redirected to the helpdesk web address. This captivation mode can remain active until the network connectivity problem has been deemed to be resolved.

4.2 mDNS Advertisements

As mentioned previously, in certain embodiments the helpdesk web address of HTTP server 116 can be a link-local URL (e.g., "http://help.local") whose corresponding IP address is advertised by network access device 104 via mDNS. For example, assume the end-user of client device 102 enters "http://help.local" in the address bar of the client device's web browser at block 202 of FIG. 2. In response, client device 102 can send an mDNS resolve request for this URL to network access device 104, which can return the IP address of HTTP server 116. Client device 102 can then use this IP address as the destination address of HTTP requests directed to http://help.local.

One potential issue with this approach is that, if there are multiple network access devices on edge network 106 of FIG. 1 (each with its own HTTP server for network troubleshooting purposes), each network access device may send out an advertisement in response to a mDNS resolve request from client device 102. This may cause client device 102 to receive multiple mDNS advertisements and potentially connect to the HTTP server of a different network access device in the same VLAN. To avoid this, each network access device may be restricted to sending out mDNS advertisements on its local access ports (i.e., ports with directly attached hosts). This ensures that client device 102 will only receive mDNS advertisements from network access device 104 (i.e., the network access device to which it is directly connected).

4.3 Multiple HTTP Server Instances

Although network access device 104 is shown as running a single instance of HTTP server 116 in FIG. 1, in some embodiments device 104 may run multiple HTTP server instances, where each instance is used for a different VLAN that is connected to device 104. This enables network access device 104 to serve different versions of the helpdesk webpage to different end-user audiences that are separated by VLAN (e.g., a teacher VLAN and a student VLAN in a school). This can be useful in scenarios where the different end-user audiences require different messaging or contact details to be presented on the helpdesk webpage. In these embodiments, network access device 104 may be configured with a different link-local IP address for each HTTP server instance to ensure that there are no IP address collisions.

4.4 Offloading Functions to Management Platform

In certain embodiments, some or all of the functions attributed to diagnostic info collection module 114 and/or HTTP server 116 above may be offloaded from network access device 104 to management platform 112. This reduces the complexity of network access device 104 while at the same time achieving the same benefits of streamlining the troubleshooting process. In these embodiments, network access device 104 can act as an HTTP proxy and forward HTTP requests/responses (using network address translation) between client device 102 and management platform 112 to facilitate webpage generation and diagnostic information collection at platform 112.

In further embodiments, rather than relying on the IT support representative to retrieve the collected diagnostic information and manually initiate the troubleshooting process, management platform 112 can implement an automated agent that can review the diagnostic information and automatically identify client-side network configuration errors that may be the cause of the network connectivity problem. Examples of such network configuration errors include, e.g., a static (rather than dynamic) IP address, manually configured DNS address(es), incorrect HTTP proxy configuration, and so on. In these embodiments, upon identifying the network configuration errors, the automated agent can present the errors to the IT support representative so that the representative can take appropriate corrective action, or can communicate with client device 102 in order to automatically apply configuration changes on the client side that will resolve the network connectivity problem.

In further embodiments, an automated agent can review the diagnostic information and automatically identify network-side configuration errors that may be the cause of the network connectivity problem. Examples of such network configuration errors include DCHP IP address exhaustion, IP subnet design errors, errors in static routes, errors in access control lists, and so on. Upon detecting the root cause of the network-side error, the automated agent could identify to an administrator the router or server (e.g., DHCP server) having the problem, or, if that router/server can be configured by the automated agent, remediate or fix the problem.

5. Example Network Switch

Figure 4:
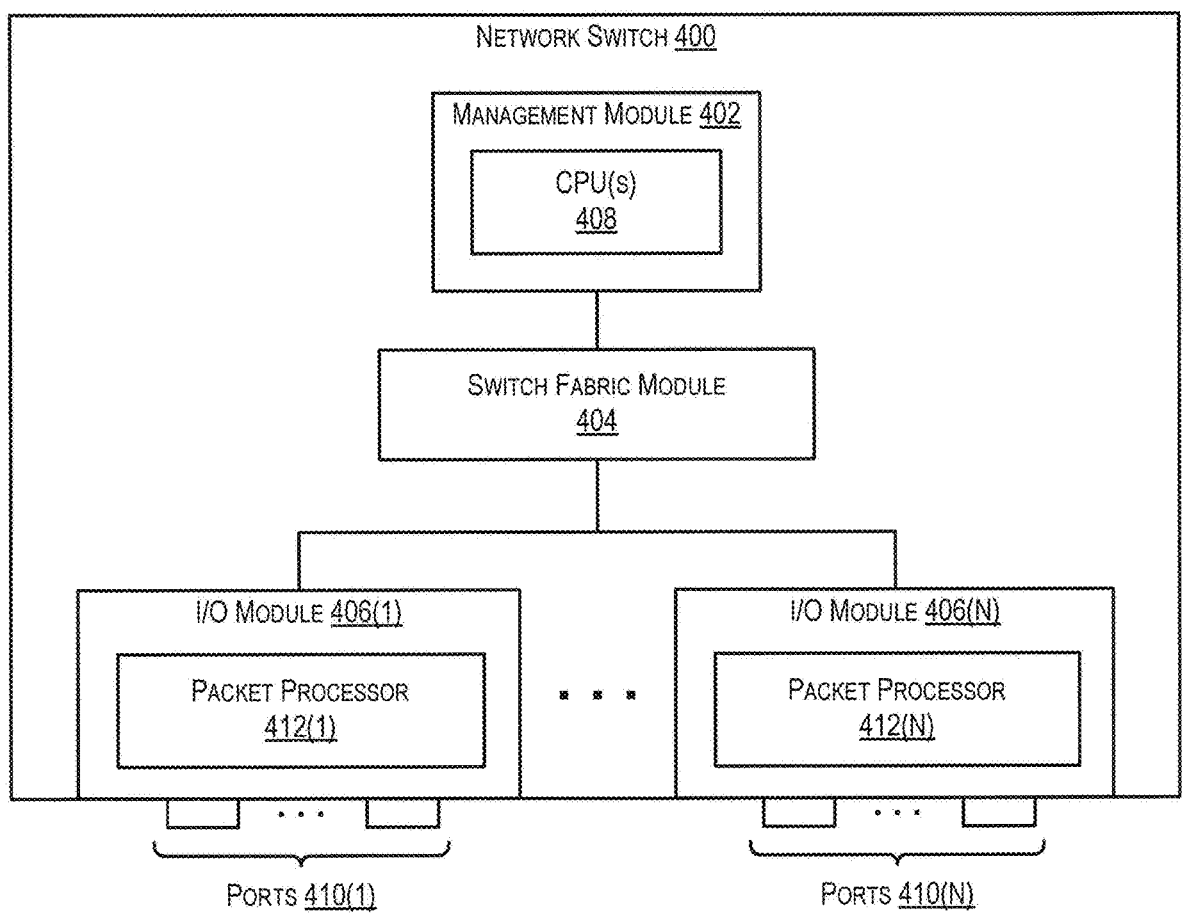
FIG. 4 depicts an example network switch according to one embodiment.

FIG. 4 depicts an example network switch 400 that may be used to implement network access device 104 of FIG. 1 according to an embodiment.

As shown, network switch 400 includes a management module 402, a switch fabric module 404, and a number of I/O modules 406(1)-406(N). Management module 402 includes one or more management CPUs 408 for managing/controlling the operation of the device. Each management CPU 408 can be a general purpose processor, such as a PowerPC, Intel, AMD, or ARM-based processor, that operates under the control of software stored in an associated memory (not shown).

Switch fabric module 404 and I/O modules 406(1)-406(N) collectively represent the data, or forwarding, plane of network switch 400. Switch fabric module 404 is configured to interconnect the various other modules of network switch 400. Each I/O module 406(1)-406(N) can include one or more input/output ports 410(1)-410(N) that are used by network switch 400 to send and receive data packets. Each I/O module 406(1)-406(N) can also include a packet processor 412(1)-412(N). Packet processor 412(1)-412(N) is a hardware processing component (e.g., an FPGA or ASIC) that can make wire speed decisions on how to handle incoming or outgoing data packets.

It should be appreciated that network switch 400 is illustrative and not intended to limit embodiments of the present invention. Many other configurations having more or fewer components than switch 400 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
receiving, by a network access device from a directly connected client device, a request directed to a preconfigured web address associated with the network access device;
generating, by the network access device in response to the request, a web page comprising a ticket number for the client device and a link or form element for submitting a support request;
transmitting, by the network access device, the web page to the client device;
receiving, by the network access device from the client device, a submission of the support request;
collecting, by the network access device in response to the submission, diagnostic information pertaining to the client device; and
transmitting, by the network access device, the diagnostic information and the ticket number to one or more remote servers.

2. The method of claim 1 wherein the client device sends the request to the network access device in response to detection of a network connectivity problem that prevents the client device from connecting to a core or wide-area network.

3. The method of claim 2 wherein the network connectivity problem is detected by the client device or an end-user of the client device.

4. The method of claim 2 wherein the network connectivity problem is detected by the network access device.

5. The method of claim 2 wherein the diagnostic information is subsequently retrieved from the one or more remote servers by a support representative in order to troubleshoot the network connectivity problem.

6. The method of claim 5 wherein the web page further comprises information for contacting the support representative.

7. The method of claim 2 wherein the diagnostic information is subsequently retrieved by an automated agent in order to automatically resolve the network connectivity problem in a network-side device or server.

8. The method of claim 1 wherein the preconfigured web address is a link-local uniform resource locator (URL).

9. The method of claim 8 wherein the network access device is configured to advertise, to the client device, an IP address corresponding to the link-local URL via multicast DNS.

10. The method of claim 1 wherein the diagnostic information includes a MAC address of the client device and an IP address of the client device.

11. The method of claim 10 wherein the diagnostic information further includes a venue ID, a network access device ID, a port ID, an authentication status, a VLAN name, and a VLAN ID.

12. The method of claim 1 wherein at least a portion of the diagnostic information is collected from one or more header fields of the request.

13. The method of claim 1 wherein at least a portion of the diagnostic information is collected from one or more port or connection settings maintained by the network access device.

14. The method of claim 1 wherein the network access device is a network switch or a wireless access point.

15. A non-transitory computer readable storage medium having stored thereon program code executable by a network access device, the program code causing the network access device to:
- receive, from a directly connected client device, a request directed to a preconfigured web address associated with the network access device;
- generate, in response to the request, a web page comprising a ticket number for the client device and a link or form element for submitting a support request;
- transmit the web page to the client device;
- receive a submission of the support request from the client device;
- collect, in response to the submission, diagnostic information pertaining to the client device; and
- transmit the diagnostic information and the ticket number to one or more remote servers.

16. The non-transitory computer readable storage medium of claim 15 wherein the client device sends the request to the network access device in response to detection of a network connectivity problem that prevents the client device from connecting to a core or wide-area network.

17. The non-transitory computer readable storage medium of claim 16 wherein the diagnostic information is subsequently retrieved from the one or more remote servers by a support representative in order to troubleshoot the network connectivity problem.

18. The non-transitory computer readable storage medium of claim 16 wherein the diagnostic information is subsequently retrieved by an automated agent in order to automatically resolve the network connectivity problem in a network-side device or server.

19. A network access device comprising:
- a processor; and
- a non-transitory computer readable medium having stored thereon program code that, when executed by the processor, causes the processor to:
  - receive, from a directly connected client device, a request directed to a preconfigured web address associated with the network access device;
  - generate, in response to the request, a web page comprising a ticket number for the client device and a link or form element for submitting a support request;
  - transmit the web page to the client device;
  - receive a submission of the support request from the client device;
  - collect, in response to the submission, diagnostic information pertaining to the client device; and
  - transmit the diagnostic information and the ticket number to one or more remote servers.

20. The network access device of claim 19 wherein the client device sends the request to the network access device in response to detection of a network connectivity problem that prevents the client device from connecting to a core or wide-area network.

21. The network access device of claim 20 wherein the diagnostic information is subsequently retrieved from the one or more remote servers by a support representative in order to troubleshoot the network connectivity problem.

22. The network access device of claim 20 wherein the diagnostic information is subsequently retrieved by an automated agent in order to automatically resolve the network connectivity problem in a network-side device or server.

* * * * *